United States Patent
Ma et al.

(10) Patent No.: US 12,390,003 B2
(45) Date of Patent: Aug. 19, 2025

(54) LIFTING DESK CONTROL SYSTEM WITH IMPERCEPTIBLE INTELLIGENT ADJUSTMENT FUNCTION AND CONTROL METHOD FOR IMPERCEPTIBLE INTELLIGENT ADJUSTMENT OF LIFTING DESK

(71) Applicant: UE FURNITURE CO., LTD., Huzhou (CN)

(72) Inventors: Tao Ma, Huzhou (CN); Fa Zhao, Huzhou (CN); Xiaoming Wang, Huzhou (CN); Keting Wang, Huzhou (CN)

(73) Assignee: UE FURNITURE CO., LTD., Huzhou (CN)

( * ) Notice: Subject to any disclaimer, the term of this patent is extended or adjusted under 35 U.S.C. 154(b) by 40 days.

(21) Appl. No.: 17/802,779

(22) PCT Filed: Jul. 6, 2022

(86) PCT No.: PCT/CN2022/104065
§ 371 (c)(1),
(2) Date: Jan. 12, 2023

(87) PCT Pub. No.: WO2023/280195
PCT Pub. Date: Jan. 12, 2023

(65) Prior Publication Data
US 2024/0197070 A1    Jun. 20, 2024

(30) Foreign Application Priority Data

Jul. 6, 2021 (CN) .......................... 202121523955.7
Aug. 27, 2021 (CN) .......................... 202122041707.5

(51) Int. Cl.
*A47B 9/00*    (2006.01)

(52) U.S. Cl.
CPC ........ *A47B 9/00* (2013.01); *A47B 2200/0056* (2013.01); *A47B 2200/0062* (2013.01)

(58) Field of Classification Search
CPC .............. A47B 9/00; A47B 2200/0056; A47B 2200/0062; G05B 19/042
See application file for complete search history.

(56) References Cited

U.S. PATENT DOCUMENTS 5,259,326 A * 11/1993 Borgman ................. A47B 9/00
                                                        108/147
6,161,806 A * 12/2000 Crosson ................. A47B 11/00
                                                        248/371

(Continued)

*Primary Examiner* — Chad G Erdman
(74) *Attorney, Agent, or Firm* — Olive Law Group, PLLC

(57) ABSTRACT

Disclosed are a lifting desk control system with an imperceptible intelligent adjustment function and a control method for imperceptible intelligent adjustment of the lifting desk. The system includes an imperceptible control system module configured to control lifting of the lifting desk in an imperceptible mode, a switching module electrically connected with the imperceptible control system module, a motor module configured to drive the lifting desk to do a lifting action, a motor drive module electrically connected between the imperceptible control system module and the motor module, a desktop, a transmission module configured to be mechanically connected with the motor module and the desktop, and a power module configured to supply power. The power module is respectively electrically connected with the switching module, the imperceptible control system module and the motor drive module. The method is applied to the imperceptible control system module, which can achieve imperceptible control over the lifting desk. By means of the present disclosure, movement of relevant joints of the human body is not affected while user's study and work are not easily disturbed, thereby relieving health problems caused when the user uses the lifting desk for a long time.

10 Claims, 2 Drawing Sheets

(56) References Cited

U.S. PATENT DOCUMENTS

| | | | | |
|---|---|---|---|---|
| 6,296,408 B1* | 10/2001 | Larkin | ................... | A47C 7/72 |
| | | | | 400/681 |
| 2006/0124036 A1* | 6/2006 | Xu | ................... | A47B 21/0314 |
| | | | | 108/20 |
| 2014/0096706 A1* | 4/2014 | Labrosse | .............. | G05B 19/048 |
| | | | | 108/21 |
| 2020/0136551 A1* | 4/2020 | Liu | ......................... | H02H 5/00 |
| 2020/0352336 A1* | 11/2020 | Jacobs | .................. | A47C 7/622 |
| 2024/0111267 A1* | 4/2024 | Li | ........................ | G05B 19/042 |

* cited by examiner

LIFTING DESK CONTROL SYSTEM WITH IMPERCEPTIBLE INTELLIGENT ADJUSTMENT FUNCTION AND CONTROL METHOD FOR IMPERCEPTIBLE INTELLIGENT ADJUSTMENT OF LIFTING DESK

CROSS REFERENCE TO RELATED APPLICATIONS

This is a national stage patent application that claims priority to and the benefit of PCT International Application No. PCT/CN2022/104065, filed Jul. 6, 2022, which claims priority to Chinese Patent No. CN 202122041707.5, filed Aug. 27, 2021 and Chinese Patent No. CN 202121523955.7, filed Jul. 6, 2021; the disclosure of which are incorporated by reference in their entireties.

TECHNICAL FIELD

The present disclosure belongs to the technical field of control systems for office furniture, and particularly relates to a lifting desk control system with an imperceptible intelligent adjustment function and a control method for imperceptible intelligent adjustment of a lifting desk.

BACKGROUND

In people's works and studies at present, office desks and study desks are mostly of fixed structures, their heights cannot be adjusted, and if users sit at these desks for a long time for study or work, the accumulation of those tendencies could cause diseases relevant to joints of human bodies such as scapulohumeral periarthritis, cervical spondylosis and lumbar spondylosis, resulting in "occupational diseases" of office workers and influences on health and development of body bones of students and growth and development of physiques.

Thus, in recent years, electric lifting desks have gradually appeared on the market, and after these lifting desks are connected to electronic control, the users may control heights of desktops by operating manual control components such as keys or handles, so as to meet requirements of adjusting user's sitting postures; and in order to remind the users of adjusting the sitting postures on time, controllers of most lifting desks may adopt manners such as sound and vibration to serve as a sedentary reminder function to remind the users of adjusting the sitting postures in time.

Although the lifting desks with electric lifting adjustment functions have appeared in recent years, actual use of the lifting desks is limited by user's use habits and limited by user's laziness; and although the lifting desks have the lifting adjustment functions, the users easily forget to adjust the heights of the desktops on time as they focus on works or studies. Even if the lifting desks have the sedentary reminder function, the reminder function is merely used for reminding, and the lifting desks must be manually operated to achieve height adjustment; and the reminder function sometimes may disrupt work or study thoughts, and the users may also be disturbed if they are frequently reminded.

Thus, during actual use of the lifting desks, the functions of the lifting desks are not exerted to the maximum degree by the users, so that a series of health problems caused by the user's sedentary occupation cannot be solved to the maximum degree; and as the functions of the lifting desks are finitely exerted, the users still easily suffer from joint diseases and great health hidden dangers affecting physical development, and normal works and studies of the users are also easily affected.

SUMMARY

In order to overcome the defects in the prior art, the present disclosure provides a lifting desk control system with an imperceptible intelligent adjustment function, which can fully exert functions of a lifting desk, relieves health problems caused by the user's sedentary occupation, and does not affect work and study of a user.

In order to achieve the above objectives, the present disclosure adopts the following technical solution: a lifting desk control system with an imperceptible intelligent adjustment function includes an imperceptible control system module configured to control lifting of the lifting desk in an imperceptible mode, a switching module electrically connected with the imperceptible control system module, a motor module configured to drive the lifting desk to do a lifting action, a motor drive module electrically connected between the imperceptible control system module and the motor module, a desktop, a transmission module configured to be mechanically connected with the motor module and the desktop, and a power module configured to supply power. The power module is respectively electrically connected with the switching module, the imperceptible control system module and the motor drive module.

Preferably, the imperceptible control system module includes a switching signal processing unit, a microprocessor control unit (MCU) arithmetic unit, an imperceptible operation proportion-integration-differentiation (PID) adjustment unit and a pulse-width modulation (PWM) generator unit. The switching signal processing unit is electrically connected with the switching module, the switching signal processing unit, the MCU arithmetic unit, the imperceptible operation PID adjustment unit and the PWM generator unit are electrically connected in sequence, the PWM generator unit is electrically connected to the motor drive module, the MCU arithmetic unit is electrically connected with a motor operation parameter calculation unit, the motor module is arranged with a rotor position sensor, the rotor position sensor is electrically connected with a rotor position sensor capture unit, and the rotor position sensor is electrically connected to the motor operation parameter calculation unit.

Preferably, the imperceptible control system further includes a timer unit configured to control timed activation and deactivation of the imperceptible operation mode, and the timer unit is electrically connected to the MCU arithmetic unit.

Preferably, the MCU arithmetic unit is electrically connected with a man-machine interaction module which is configured to feed back and display a real-time state of the user.

Preferably, the switching module includes a common lifting function switch configured to control lifting of the desktop at a normal speed, an imperceptible function switch configured to control lifting of the desktop at an imperceptible speed, and an initialization switch. The common lifting function switch and the imperceptible function switch may be integrated into a switch with a plurality of functions or may be formed by a plurality of independent switches with independent functions.

Preferably, the switching module may be a mechanical type switch or an electronic type touch key.

Preferably, the motor drive module adopts an H-bridge circuit structure.

Preferably, the man-machine interaction module adopts one or more intelligent interaction modules of an LED nixie tube, a display screen, an upper computer interface and a Bluetooth speaker.

A control method for imperceptible intelligent adjustment of a lifting desk is applied to the imperceptible control system module on the lifting desk. The imperceptible control system module includes a switching signal processing unit, an MCU arithmetic unit, an imperceptible operation PID adjustment unit and a PWM generator unit. The switching signal processing unit, the MCU arithmetic unit, the imperceptible operation PID adjustment unit and the PWM generator unit are electrically connected in sequence, the PWM generator unit is configured to control lifting drive of the lifting desk, the MCU arithmetic unit is electrically connected with a motor operation parameter calculation unit, and the motor operation parameter calculation unit is electrically connected with a rotor position sensor capture unit which is configured to capture a rotor position signal in real time. The method includes:

step S01, making the MCU arithmetic unit start to operate, when the switching signal processing unit receives an imperceptible activating signal;

step S02, calculating, by the motor operation parameter calculation unit, a current speed, a current acceleration and a current position of a motor based on the rotor position signal sent by the rotor position sensor capture unit, and sending calculation results to the MCU arithmetic unit to serve as PID input parameters of imperceptible operation adjustment;

step S03, calculating and outputting, by the imperceptible operation PID adjustment unit targeting a preset acceleration and a preset speed, a voltage value needed by a target acceleration and a target speed to the PWM generator unit; and step S04, outputting, by the PWM generator unit, a PWM duty ratio based on the voltage value calculated above, so as to control the lifting desk to do an imperceptible lifting action.

Preferably, the method further includes: repeating calculation steps S02-S04 every other a period of time.

Preferably, the imperceptible operation PID adjustment unit calculates and obtains the voltage value needed by the target acceleration and the target speed according to a formula $$U(t) = kp\left(err(t) + \frac{1}{T_I}\int err(t)dt + \frac{T_D derr(t)}{dt}\right);$$

where, err(t) shows differences between the current acceleration value and the target acceleration value and between the current speed value and the target speed value, and two latter items of the formula are an integral and a differential of err(t); and Kp is a coefficient, and the acceleration and the speed are close to the preset acceleration and the preset speed by adjusting the coefficient and the differences.

The present disclosure has the following technical effects:

1. Due to the arrangement of the imperceptible control system, the lifting desk can be controlled to do the lifting action at the ultralow acceleration and the ultralow speed according to a preset fixed imperceptible lifting height, and the desktop does not shake or gives sound during start and stop and operation, thereby achieving imperceptible adjustment in the desktop without affecting the user; and meanwhile, the control system assists the user in adjusting turning joints of the human body up and down unconsciously, so that movement of the relevant joints of the human body is not affected while it is ensured that user's study and work are not easily disturbed, thereby ensuring health when the user uses the lifting desk for a long time.

2. Due to operation in the imperceptible mode, a utilization rate of a lifting function can also be maximized, so as to further solve the health problems caused by sedentariness due to laziness or use habits and to further ensure health and safety of the user using the lifting desk.

3. Due to the arrangement of the switching module, the common speed mode and the imperceptible mode can be freely switched, so as to meet requirements in different usage states, while ensuring flexibility and convenience and comfort of the user when in use.

Reference to numerals of main technical features in the figures: 1. Switching module; 2. Power module; 3. Imperceptible control system module; 4. Motor drive module; 5. Motor module; 6. Transmission module; 7. Desktop; 8. Man-machine interaction module; 3.1. Switching signal processing unit; 3.2. MCU arithmetic unit; 3.3. Imperceptible operation PID adjustment unit; 3.4. PWM generator unit; 3.5. Motor operation parameter calculation unit; 3.6. Rotor position sensor capture unit; 3.7. Timer unit; and 5.1. Rotor position sensor.

DETAILED DESCRIPTION OF THE EMBODIMENTS

The present disclosure will be further described below with reference to specific implementations and accompanying drawings.

Figure 1:
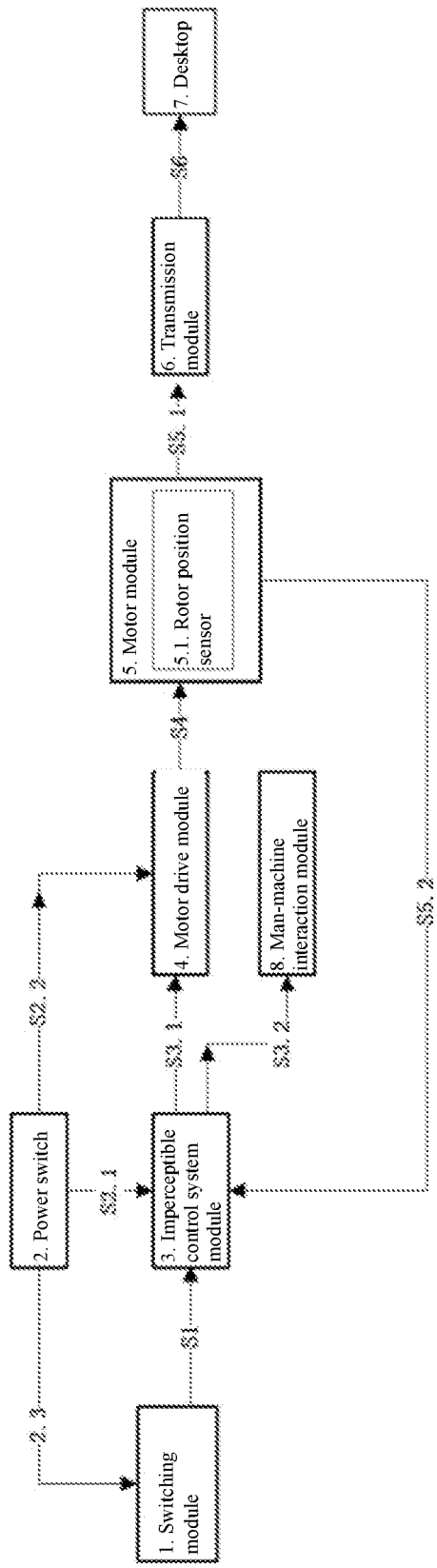
FIG. 1 is a flow schematic diagram of a system according to the present disclosure.

As shown in FIG. 1, a lifting desk control system with an imperceptible intelligent adjustment function includes a switching module 1, a power module 2, an imperceptible control system module 3, a motor drive module 4, a motor module 5, a transmission module 6 and a desktop 7. The imperceptible control module is electrically connected with the switching module 1 through an S1 connecting line. The motor drive module is electrically connected with the imperceptible control system module 3 through an S3.1 connecting line, and it adopts an H-bridge circuit structure. The motor module 5 is electrically connected with the motor drive module through an S4 connecting line. One end of the transmission module 6 is mechanically connected with the motor module 5 through an S5.1 mechanical connector, and the S5.1 mechanical connector may be a common connector such as a common coupler and a key. The other end of the transmission module 6 is connected with the desktop 7 through an S6 mechanical connector, and the S6 mechanical connector may be an articulated element such as a common hinge or a detachable fixed connector such as a bolt and a nut. The power module 2 is electrically connected with the switching module 1 through an S2.3 connecting line, electrically connected with the imperceptible control system module 3 through an S2.1 connecting line, and electrically connected with the motor drive module through an S2.2 connecting line.

Furthermore, the power module 2, the switching module 1, the imperceptible control system module 3, the motor drive module, the man-machine interaction module 8 and the desktop 7 are fixed through mechanical connection.

Specifically, the switching module 1 may be a mechanical type switch or an electronic type touch key, it includes a common lifting function switch, an imperceptible function switch and an initialization switch, and the common lifting function switch and the imperceptible function switch may be integrated into a switch with a plurality of functions or may be formed by a plurality of independent switches with independent functions.

Figure 2:
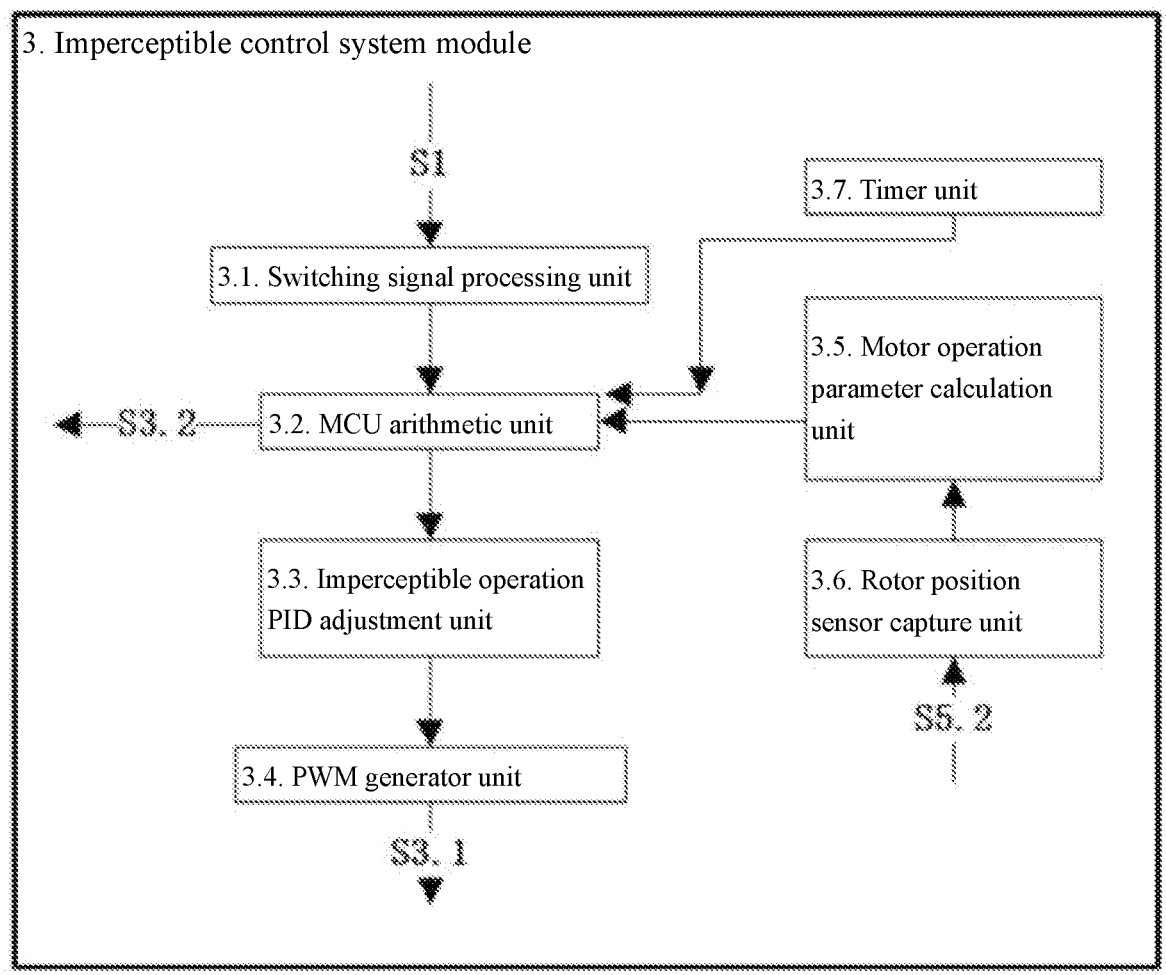
FIG. 2 is a flow schematic diagram of an imperceptible control system module.

Specifically, as shown in FIG. 2, the imperceptible control system module 3 includes a switching signal processing unit 3.1, an MCU arithmetic unit 3.2, an imperceptible operation PID adjustment unit 3.3, a PWM generator unit 3.4 and a timer unit 3.7, and the switching signal processing unit 3.1 is electrically connected with the switching module 1 through the S1 connecting line. The switching signal processing unit 3.1, the MCU arithmetic unit 3.2, the imperceptible operation PID adjustment unit 3.3 and the PWM generator unit 3.4 are electrically connected in sequence. The PWM generator unit 3.4 is electrically connected to the motor drive module 4 through the S3.1 connecting line. The timer unit 3.7 is electrically connected with the MCU arithmetic unit 3.2.

Furthermore, the MCU arithmetic unit 3.2 is electrically connected with a motor operation parameter calculation unit 3.5, and the motor operation parameter calculation unit is a motor speed, acceleration and position calculation unit. The motor module 5 is installed with a rotor position sensor 5.1 which is electrically connected with a rotor position sensor capture unit 3.6, and the rotor position sensor 5.1 electrically connected with the motor operation parameter calculation unit 3.5 through an S5.2 connecting line.

Furthermore, the MCU arithmetic unit 3.2 is electrically connected with a man-machine interaction module 8 through an S3.2 connecting line, and the man-machine interaction module 8 adopts one or more intelligent interaction modules such as an LED nixie tube, a display screen, an upper computer interface and a Bluetooth speaker.

The specific implementation process of the present disclosure is as follows: as shown in FIG. 1-FIG. 2, when the lifting desk control system works:
1. The power module 2 is powered on, so that the switching module 1, the imperceptible control system module 3 and the motor drive module 4 are powered on.
2. A user presses the initialization switch, and then the whole lifting desk control system is initialized.
3. A lifting mode of the lifting desk is selected: the common lifting function switch is pressed by default, and the desktop 7 does a lifting action at a lifting speed of 30 mm/s; when an imperceptible lifting function is selected, the imperceptible function switch is pressed, and the desktop 7 does the lifting action at the lifting speed of 1 mm/s; and when the imperceptible lifting function is deactivated, the imperceptible function switch may be pressed again to deactivate the function.
4. After the user presses the imperceptible lifting switch, a switching signal is transmitted to the imperceptible control system module 3 through the S1 connecting line; and the imperceptible control system module 3 outputs a corresponding instruction signal according to a preset function of the switching signal, the instruction signal is output to the motor drive module 4, the motor drive module 4 transmits corresponding power to the motor module 5 through the S4 connecting line; after the motor module 5 receives the power, a motor starts to rotate, and the rotor position sensor 5.1 in the motor transmits motor rotor position information to the imperceptible control system module 3 in a telecommunication manner.
5. After the imperceptible function is activated, and after the imperceptible control system module 3 receives the rotor position information, an acceleration, speed and position of the motor are calculated by the motor operation parameter calculation unit 3.5; and then a PWM duty ratio corresponding to a voltage value needed by a target acceleration and a target speed is calculated and output according to real-time comparison of the calculated acceleration and a preset acceleration and comparison of the calculated speed and a preset speed, and the PWM duty ratio is transmitted to the motor drive module 4, so as to control power to be supplied to the motor; and calculation is repeated once every other a period of time, and closed-loop control is achieved through iterative calculation, thereby achieving the imperceptible operation state.
6. During imperceptible lifting of the desktop 7, the imperceptible control system module 3 transmits operation state information to the man-machine interaction module 8, and a current use state of the user can be fed back and displayed according to real-time state display of the man-machine interaction module 8.
7. After the motor module 5 starts to rotate, the transmission module 6 may operate back and forth in an extending and retracting manner, so as to drag the desktop 7 to operate up and down to achieve lifting of the lifting desk.

When the imperceptible control system module 3 operates:
1. The switching signal processing unit 3.1 receives the switching signal sent by the switching module 1 and transmits the switching signal to the MCU arithmetic unit 3.2; and the rotor position sensor capture unit 3.6 captures a rotor position signal sent by the rotor position sensor, the rotor position signal is transmitted to the motor operation parameter calculation unit 3.5, the motor operation parameter calculation unit 3.5 calculates information such as a current speed, a current acceleration and a current position of the motor, and then calculation results are transmitted to the MCU arithmetic unit 3.2 in a telecommunication manner to serve as PID input parameters of imperceptible operation adjustment.
2. The imperceptible operation PID adjustment unit 3.3 utilizes an existing algorithm and formula:
err(t) shows differences between the current acceleration value and the target acceleration value and between the current speed value and the target speed value, and two latter items of the formula are an integral and a differential of err(t); and Kp is a coefficient, and the acceleration and speed are infinitely close to the preset acceleration and the preset speed through actual debugging by adjusting the coefficient and the differences.
3. After the imperceptible operation PID adjustment unit 3.3 calculates the parameters, the result is output to the PWM generator unit 3.4, and a PWM generator outputs a corresponding duty ratio signal. Then the duty ratio signal is transmitted to the motor drive module 4 through the S3.1 connecting line in a telecommunication manner, the motor drive module 4 transmits a corresponding equivalent voltage to the motor, and the motor starts to operate. As a result, motor position information may be transmitted to the imperceptible control system module 3 in real time, the motor position information is processed every other a period of time, so as to calculate information such as the current speed and the current acceleration of the motor, the current speed and the current acceleration are compared with preset target values for calculation relative to feedback, and the actual acceleration and the actual speed of the motor are infinitely close to the target values by iteratively calculating the current step, thereby finally achieving the ultralow acceleration and the ultralow constant speed of the motor during start and stop.

4. In order to adapt to start features of most motors and lifting desk structure systems, the target acceleration and target speed values of the PID algorithm may be adjusted at will, so as to achieve the effect that the user does not feel shaking and sound of the desktop 7 in lifting.

5. When the imperceptible lifting mode is activated, lifting of the desktop 7 is started and stopped and adjusted at the ultralow speed according to steps 1-4, and the desktop firstly starts to slowly ascend by 15 cm at the ultralow speed (1 mm/s) by default. Then the desktop stops ascending for 10 min, descends by 15 cm at the ultralow speed (1 mm/s), and then stops for 5 min, which operates in this way in a circulating manner. The user may actively deactivate this function in this process. The operation speed, travel range and stop time may be set at will within a reasonable range.

6. After the imperceptible lifting mode is activated, imperceptible operation timed deactivation time may be set at will in the timer unit 3.7, if no one operates within 4 h, the control system automatically deactivates the imperceptible function, and the imperceptible function needs to be manually actively activated at the next time.

The above descriptions are merely the specific embodiments of the present disclosure, which are not intended to limit structural features of the present disclosure. The present disclosure may be used on similar products. Any change or modification made by any person skilled in the art in the field of the present disclosure should fall within the patent scope of the present disclosure.

What is claimed is:

1. A lifting desk control system for an imperceptible intelligent adjustment function, comprising an imperceptible control system module configured to control lifting of the lifting desk in an imperceptible mode, a switching module electrically connected with the imperceptible control system module, a motor module configured to drive the lifting desk to do a lifting action, a motor drive module electrically connected between the imperceptible control system module and the motor module, a desktop, a transmission module configured to be mechanically connected with the motor module and the desktop, and a power module configured to supply power, wherein the power module is respectively electrically connected with the switching module, the imperceptible control system module and the motor drive module, the imperceptible control system module comprises a switching signal processing unit, an MCU arithmetic unit, an imperceptible operation PID adjustment unit and a PWM generator unit, the switching signal processing unit is electrically connected with the switching module, the switching signal processing unit, the MCU arithmetic unit, the imperceptible operation PID adjustment unit and the PWM generator unit are electrically connected in sequence, the PWM generator unit is electrically connected to the motor drive module, the MCU arithmetic unit is electrically connected with a motor operation parameter calculation unit, the motor module is arranged with a rotor position sensor, the rotor position sensor is electrically connected with a rotor position sensor capture unit, and the rotor position sensor is electrically connected with the motor operation parameter calculation unit.

2. The lifting desk control system with the imperceptible intelligent adjustment function according to claim 1, wherein the imperceptible control system further comprises a timer unit configured to control timed activation and deactivation of an imperceptible operation mode, and the timer unit is electrically connected to the MCU arithmetic unit.

3. The lifting desk control system with the imperceptible intelligent adjustment function according to claim 1, wherein the MCU arithmetic unit is electrically connected with a man-machine interaction module which is configured to feed back and display a real-time state of a user.

4. The lifting desk control system with the imperceptible intelligent adjustment function according to claim 3, wherein the man-machine interaction module adopts one or more intelligent interaction modules of an LED nixie tube, a display screen, an upper computer interface and a Bluetooth speaker.

5. The lifting desk control system with the imperceptible intelligent adjustment function according to claim 1, wherein the switching module comprises a common lifting function switch configured to control lifting of the desktop at a normal speed, an imperceptible function switch configured to control lifting of the desktop at an imperceptible speed, and an initialization switch, and the common lifting function switch and the imperceptible function switch may be integrated into a switch with a plurality of functions or may be formed by a plurality of independent switches with independent functions.

6. The lifting desk control system with the imperceptible intelligent adjustment function according to claim 4, wherein the switching module may be a mechanical type switch or an electronic type touch key.

7. The lifting desk control system with the imperceptible intelligent adjustment function according to claim 1, wherein the motor drive module adopts an H-bridge circuit structure.

8. A control method for imperceptible intelligent adjustment of a lifting desk, applied to the imperceptible control system module on the lifting desk, wherein the imperceptible control system module comprises a switching signal processing unit, an MCU arithmetic unit, an imperceptible operation PID adjustment unit and a PWM generator unit, the switching signal processing unit, the MCU arithmetic unit, the imperceptible operation PID adjustment unit and the PWM generator unit are electrically connected in sequence, the PWM generator unit is configured to control lifting drive of the lifting desk, the MCU arithmetic unit is electrically connected with a motor operation parameter calculation unit, and the motor operation parameter calculation unit is electrically connected with a rotor position sensor capture unit which is configured to capture a rotor position signal in real time; and the method comprises:

step S01, making the MCU arithmetic unit start to operate, when the switching signal processing unit receives an imperceptible activating signal;

step S02, calculating, by the motor operation parameter calculation unit, a current speed, a current acceleration and a current position of a motor based on the rotor position signal sent by the rotor position sensor capture unit, and sending calculation results to the MCU arithmetic unit to serve as PID input parameters of imperceptible operation adjustment;

step S03, calculating and outputting, by the imperceptible operation PID adjustment unit targeting a preset acceleration and a preset speed, a voltage value needed by a target acceleration and a target speed to the PWM generator unit; and step S04, outputting, by the PWM generator unit, a PWM duty ratio based on the voltage value calculated above, so as to control the lifting desk to do an imperceptible lifting action.

9. The control method for imperceptible intelligent adjustment of the lifting desk according to claim 8, further comprising: repeating calculation steps S02-S04 every other a period of time.

10. The control method for imperceptible intelligent adjustment of the lifting desk according to claim 8, wherein the imperceptible operation PID adjustment unit calculates and obtains the voltage value needed by the target acceleration and the target speed according to a formula $$U(t) = kp\left(err(t) + \frac{1}{T_I}\int err(t)dt + \frac{T_D derr(t)}{dt}\right);$$

where, err(t) shows differences between the current acceleration value and the target acceleration value and between the current speed value and the target speed value, and two latter items of the formula are an integral and a differential of err(t); and Kp is a coefficient, and the acceleration and the speed are close to the preset acceleration and the preset speed by adjusting the coefficient and the differences.

* * * * *